2,805,247

IMPROVEMENT IN GLYCOL-CENTERED POLY-ESTER PREPARATION

Hans G. Krischai, Oxford, England, assignor to Esso Research and Engineering Company, a corporation of Delaware No Drawing. Application June 8, 1954,
Serial No. 435,372

Claims priority, application Great Britain July 2, 1953

6 Claims. (Cl. 260—485)

This invention relates to a process for the manufacture of liquid organic esters and in particular to the manufacture of ester products containing a plurality of ester groups.

The type of esterification reaction for which this process is particularly advantageous is the preparation of complex esters or of blends containing a proportion of complex ester. Complex esters are here meant to include esters containing more than three acid, alcohol, polybasic acid or polyhydric alcohol residues and in which there is at least one polyhydric alcohol and one polybasic acid residue each of which has at least two of its functional groups esterified. They may be formed by the esterification, in one or more stages, of mixtures of multifunctional acids and multifunctional acohols with or without monofunctional acids, monofunctional acids and alcohols, or monofunctional alcohols. They may also be formed from compounds containing both hydroxy and carboxy groups or containing both alcohol and/or acid reacting groups. In fact the complex ester class includes all those compounds in the molecule of which at least two residues each with a plurality of esterifiable groups has at least two of such groups esterified. Where present the monofunctional components normally provide the terminal groups and their proportion in the esterification mixture determines the average number of multifunctional acid and alcohol groups that will be present in the final ester molecule. In many cases the theoretical molecular structure of the complex ester molecule may represent an average only, individual molecules differing widely in chain length and configuration. In general it is preferred to use aliphatic materials, and in any case the esters should be free of olefinic unsaturation. Some complex esters have been suggested as lubricants, see, for example, British patent specifications Nos. 666,697, 664,992, 662,650, 659,103, 668,663 and 699,402. In general, liquid complex esters have most attractive lubricating properties. These lubricating properties are also, to a considerable extent, bestowed on blends containing a proportion of complex ester. Such a blend may be made by mechanical mixing. A particularly useful blend comprises a liquid mixture of a complex ester and a liquid aliphatic diester or monoester. Such a blend may be made by mixing the components mechanically or by reaction in which the esters are made substantially simultaneously.

The particularly preferred complex esters have the general formula:

$$R_1OOCR_2COOR_3OOCR_4COOR_5$$

and are conveniently made in two stages. In this formula $R_1$ and $R_5$ are the residues of monohydric aliphatic alcohols, $R_2$ and $R_4$ are the residues of aliphatic dicarboxylic acids and $R_3$ is the residue of a glycol or polyglycol. It is preferred that the components of the complex ester have between 2 and 40 carbon atoms and it is normally convenient to have $R_1$ the same as $R_5$ and $R_2$ the same as $R_4$. $R_1$ and $R_5$ are preferably aliphatic monohydric alcohol residues such as the fatty alcohols or Oxo alcohols having from, say, 6 to 20 carbon atoms; it is also normally preferred that these groups are not straight chain groups. $R_2$ and $R_4$ are preferably residues of acids of the formula $HOOC(CH_2)_nCOOH$ where $n$ is less than 20 and includes oxalic acid. $R_3$ is preferably the residue of a glycol or diol. Useful diols are alkalene diols having between 2 and 16 carbon atoms preferably having the hydroxy groups on adjacent carbon atoms and particularly 1,2 diols. Glycols or polyglycols may also account for the residue $R_3$, particularly polyalkylene glycols of the general formula:

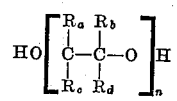

where $R_a$, $R_b$, $R_c$ and $R_d$ are hydrogen or any of them up to two are methyl groups or any one is an ethyl group and where $n$ is 1 to 12.

A complex ester closely related to the above and one that is also useful is one having the general formula:

$$R_6COOR_3OOCR_2COOR_3'OOCR_7$$

where $R_2$ and $R_3$ have the same meaning as before and where $R_3'$ has the same definition as $R_3$ and is preferably the same as $R_3$. $R_6$ and $R_7$ are preferably the same and are the residues of aliphatic monocarboxylic acids preferably having from 4 to 22 carbon atoms.

The particularly preferred complex esters are made by esterifying mixtures of glycols, dicarboxylic acids and monohydric alcohols, the reactants being in the proportion to fulfill the equation $x+2y=2z$, where $x$ represents the total moles of alcohol residues, $y$ represents the total moles of glycol residues and $z$ represents the total moles of acid residues. It will be understood that these are the preferred proportions of the reactants which proportions are not necessarily the same as will appear in the resulting ester.

The esterification is conveniently carried out under reflux at elevated temperatures in the region of 120–160° C. using an esterification catalyst such as sulphuric acid, an alkali metal, preferably sodium bisulphate or an aryl sulphonic acid and a water entrainer such as a light hydrocarbon fraction having an aqueous azeotrope.

Complex esters of the particularly preferred class are most convenienly prepared in one of three ways:

1. One-stage reaction of stoichiometric amounts of the components.

2. Reaction of equimolar amounts of the monohydric alcohol and dicarboxylic acid to the alcohol half-ester, followed by reaction of two moles of the latter with 1 mole of glycol.

3. Reaction of the two molar proportions of the acid with one molar proportion of the glycol followed by esterification of the acid product with the alcohol.

In general, complex esters may be prepared by a one-stage, two-stage or multi-stage process under controlled conditions.

The preferred preparation by the glycol half-ester may be represented thus:

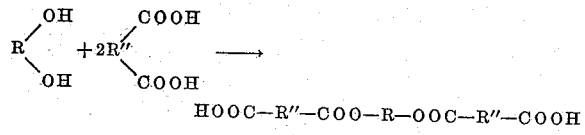

$$HOOC-R''-COO-R-OOC-R''-COOH$$
$$HOOC-R''-COOR-OOCR''-COOH + 2R'OH \longrightarrow$$
$$R'OOC-R''-COO-R-OOC-R''-COOR'$$

Particularly preferred starting materials are, as dicarboxylic acid—adipic or sebacic acid or mixtures of the two; as alcohols—branched chain $C_8$—$C_9$ saturated alcohols, e. g. Oxo alcohols or mixtures in which such alcohols predominate, and as glycols—polyethylene glycols up to hexaethylene glycol or polyethylene glycol fractions whose average molecular weight does not substantially exceed that of hexaethylene glycol.

It has now been discovered that there is produced a range of ester products in the esterification reactions described. Thus in the case of the preferred complex ester there is probably formed a product having the configuration:

Alcohol—(dicarboxylic acid—glycol)$_n$—dicarboxylic acid—alcohol where $n$ is of the order of 1–2 or 3, often about 1.8. However, such esters, formed by conventional reaction and having higher linear polyester components, suffer from the disadvantage that, at low temperatures the products tend to thicken.

The reason for this curious effect at low temperatures is somewhat obscure. However, the effect is that at a low temperature, e. g. —40°, the complex ester, or blend containing complex ester, thickens with time. This thickening is reversible, that is to say that on heating the blend up it assumes the same viscosity at, say, 100° F. as it had before cooling. Moreover, on cooling once more, the initial low temperature viscosity which is quite low, increases with time.

Whatever causes this phenomenon, it is undesirable. For example, liquid complex esters either alone or blended with other liquid products, are valuable lubricants. They have excellent load bearing properties and their viscosity temperature characteristics are superior to conventional mineral base lubricants. However, for aviation turbine lubricants, for which service these ester products are particularly adapted, good low temperature properties are highly desirable. The object of the present invention is to provide a process for the production of complex esters or blends containing complex esters, in which there is a marked reduction in the tendency of the lubricant to thicken at low temperatures.

This invention comprises a method of esterification for the production of complex esters or blends containing complex esters, in which local polyhydric alcohol or glycol concentrations in the reactor are kept low—particularly in the first or early stages of the reaction. It is believed that in this way, the formation of higher polyesters from, for example, the polyalkylene glycol and the dicarboxylic acid, is much reduced.

A convenient method whereby this invention is applied comprises adding the polyhydric alcohol or polyalkylene glycol at a very slow rate during the first stage of the complex ester manufacture, and it is preferred that this slow addition is extended over at least 20% of the reaction time with the glycol. Preferably this addition is so prolonged as to take place over the entire reaction time in the glycol esterification stage (normally the stage wherein the glycol half-ester is formed) although slow addition of the glycol up to the point where ⅔ of the glycol has been added is really sufficient. It is also advisable to stir the reaction mixture as efficiently as possible during the entire time of admission of the glycol. It is normally desirable to add an excess of alcohol in the second stage of the esterification and 20% excess is normally convenient.

In the first stage where the glycol is added dropwise to the dicarboxylic acid, care must be taken since the acid is solid and local overheating has to be avoided. It is preferred to use an excess of water carrier having a boiling point higher than the melting point of the acid so that the glycol is added to a slurry of acid. The use of an excess of such a water carrier contributes to an improvement in low temperature properties.

The virtue of preparing a complex ester according to the process of this invention will be manifest from the following example for the two-stage preparation of a complex ester from polyethylene glycol 200 (a polyethylene glycol mixture of mean molecular weight about 200) sebacic acid and 2-ethyl hexanol in molecular proportion 1:2:2.

| | Viscosity at 210° F., cs. | Viscosity at —40°, cs. | Viscosity at —40° after 17 hours at —40°, cs. |
|---|---|---|---|
| Complex ester prepared by slow addition of polyglycol | 11.2 | 29,100 | 30,300 |
| Conventionally prepared complex ester | 10.7 | 25,900 | solid |

In this preparation the ester was made in two stages by the glycol half-ester as described in the preferred method above.

An alternative approach to avoid local concentrations of glycol resides in carrying out the reaction in the presence of an excess of sebacic acid. In this way, reaction mixtures are obtained, after the first stage, containing free sebacic acid which can be subsequently esterfied during the second stage of the manufacture to give relatively high amounts of diesters as well as complex esters. Since these diesters are relatively fluid, the products have viscosities lower than those of normal complex esters.

In order to obtain blends of the viscosity range of normal complex esters, the diester component can be stripped off partly or completely using a vacuum or steam distillation or a combination of both thus increasing the viscosity of the oil. Alternatively, the complex ester may be separated from the diester by processes such as absorption, e. g. chromatographic absorption on silica gel. The diester component can be eluted with aromatic solvents such as benzene having the complex ester on the absorbent. The complex ester may be eluted from the absorbent by a more polar solvent such as acetone. The following table shows the result of using excess sebacic acid in the production of the previous example.

| Ratio polyglycol | k. v. at 210° F., cs. | k. v. at —40°, cs. | k. v. at —40° after 17 hrs. at —40° |
|---|---|---|---|
| Sebacic acid: | | | |
| 1:4 | 5.42 | 4,916 | 5,081 |
| 1:3 | 6.43 | 7,890 | 7,920 |
| Conventional preparation of a blend of complex ester/diester | 7.5 | 12,800 | 62,200 |

To sum up the present invention comprises a method of producing complex esters of the generic form:

A—B—C—B—A where A, B and C are residues of glycols, alcohols, acids or dicarboxylic acids and wherein the linkages are ester groups, wherein the half-ester —B—C—B— is produced in a first stage and the esterification with —A is performed in a second stage and wherein, in the first stage, there is no high local concentration of —C—. The preferred methods of performing this invention comprise either adding —C— dropwise in the first stage of the reaction, or maintaining an excess of —B— during this first stage.

What I claim is:

1. In a method of preparing complex ester synthetic lubricants having the general formula $R_1(OOCR_2COOR_3)_nOOCR_4COOR_5$ wherein $R_1$ and $R_5$ are residues of monohydric aliphatic alcohols having from 6 to 20 carbon atoms; wherein $R_2$ and $R_4$ are the group —(CH$_2$)$_x$—, $x$ being a number of from 0 to 20; wherein $R_3$ is the residue of a glycol having from 2 to 16 carbon atoms and wherein $n$ is a number of from 1 to 3, comprising the steps of partially esterifying the dicarboxylic acid with the glycol in the molar ratio of 2 mols of dicarboxylic acid per mol of glycol to form a partial ester, and subsequently fully esterifying said partial ester with an alcohol, the improvement which comprises carrying out the partial esterification reaction in the presence of low concentrations of glycol by controlling the rate of glycol addition to the dicarboxylic acid so that glycol is added during at least 20% of the total partial esterification reaction time, whereby there is formed a complex ester having improved low temperature properties.

2. A process according to claim 1 wherein the glycol is added during 75% of the total partial esterification reaction time.

3. A process according to claim 1 wherein the glycol is added throughout the total partial esterification reaction time.

4. A process according to claim 1 wherein the glycol addition is accompanied by efficient stirring of the reaction mixture.

5. A process according to claim 1 wherein an excess of a water carrier having a boiling point higher than the melting point of the dibasic acid is used to slurry the dibasic acid during the partial esterification reaction.

6. A process according to claim 1 wherein the alcohol used is 2-ethyl hexanol, the dibasic acid is sebacic acid, and the glycol is a polyethylene glycol of a molecular weight of about 200 in a molar proportion of 2:2:1.

References Cited in the file of this patent

UNITED STATES PATENTS

| | | |
|---|---|---|
| 2,499,984 | Beavers et al. | Mar. 7, 1950 |
| 2,628,974 | Sanderson | Feb. 17, 1953 |
| 2,666,781 | Ford | Jan. 19, 1954 |
| 2,695,279 | Kahn et al. | Nov. 23, 1954 |